(12) United States Patent
Zhamu et al.

(10) Patent No.: US 10,511,016 B2
(45) Date of Patent: Dec. 17, 2019

(54) GRAPHENE-PROTECTED LEAD ACID BATTERIES

(71) Applicant: Nanotek Instruments, Inc., Dayton, OH (US)

(72) Inventors: Aruna Zhamu, Centerville, OH (US); Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 202 days.

(21) Appl. No.: 15/365,049

(22) Filed: Nov. 30, 2016

(65) Prior Publication Data

US 2018/0151872 A1 May 31, 2018

(51) Int. Cl.

| H01M 4/36 | (2006.01) |
|---|---|
| H01M 4/14 | (2006.01) |
| H01M 4/38 | (2006.01) |
| H01M 4/56 | (2006.01) |
| H01M 4/62 | (2006.01) |

(Continued)

(52) U.S. Cl.
CPC ............ H01M 4/362 (2013.01); H01M 4/14 (2013.01); H01M 4/364 (2013.01); H01M 4/366 (2013.01); H01M 4/38 (2013.01); H01M 4/56 (2013.01); H01M 4/625 (2013.01); H01M 4/628 (2013.01);

(Continued)

(58) Field of Classification Search
CPC ........ H01M 4/14; H01M 4/362; H01M 4/364; H01M 4/366; H01M 4/38; H01M 4/56; H01M 4/625; H01M 4/628; H01M 10/12; H01M 2004/027; Y02T 10/7016

See application file for complete search history.

(56) References Cited

U.S. PATENT DOCUMENTS

| 2,798,878 A | 7/1957 | Hummers | |
|---|---|---|---|
| 2006/0269801 A1* | 11/2006 | Honbo | ............... H01M 2/0242 429/7 |

(Continued)

FOREIGN PATENT DOCUMENTS

| CN | 102244300 A | * | 11/2011 |
|---|---|---|---|
| CN | 105655581 A | * | 6/2016 |
| JP | 2003123760 A | * | 4/2003 |

OTHER PUBLICATIONS

Linden; "Handbook of Batteries" Chapter 23—Lead-Acid Batteries, pp. 23.1-23.88. (Year: 2002).*

(Continued)

Primary Examiner — Gregg Cantelmo

(57) ABSTRACT

A lead acid battery comprising a negative electrode, a positive electrode comprising lead oxide, an electrolyte in physical contact with the negative electrode and the positive electrode, an optional separator positioned between the negative electrode and the positive electrode, wherein the negative electrode comprises a plurality of particulates of graphene-protected lead or lead alloy, wherein at least one of the particulates is formed of a single or a plurality of graphene sheets and a single or a plurality of fine lead or lead alloy particles having a size smaller than 10 μm, and the graphene sheets and the particles are mutually bonded or agglomerated into the particulate with at least a graphene sheet embracing or wrapping around the particulate, and wherein graphene is in an amount of at least 0.01% but less than 99% by weight based on the total weight of the particulate.

37 Claims, 9 Drawing Sheets

(51) Int. Cl.
*H01M 10/12* (2006.01)
*H01M 4/02* (2006.01)

(52) U.S. Cl.
CPC ...... *H01M 10/12* (2013.01); *H01M 2004/027* (2013.01); *Y02T 10/7016* (2013.01)

(56) References Cited

U.S. PATENT DOCUMENTS

| | | |
|---|---|---|
| 2008/0279756 A1 | 11/2008 | Zhamu et al. |
| 2012/0064409 A1 | 3/2012 | Zhamu et al. |
| 2012/0248383 A1* | 10/2012 | Atanassova ............. H01M 4/56 252/506 |
| 2013/0004841 A1 | 1/2013 | Thompkins et al. |

OTHER PUBLICATIONS www.espacenet.com machine translation of CN 102244300 A (Year: 2011).*
www.espacenet.com machine translation of CN 105655581 A (Year: 2016).*
Yeung et al. "Enhanced cycle life of lead-acid battery using graphene as a sulfation suppression additive in negative active material"; RSC Advances 2015, 5, pp. 71314-71321 (published on Aug. 17, 2015). (Year: 2015).*
F. Karlicky, et al. "Halogenated Graphenes: Rapidly Growing Family of Graphene Derivatives" ACS Nano, 2013, 7 (8), pp. 6434-6464.
PCT/US17/62926 International Search Report and Written Opinion dated Apr. 5, 2018, 15 pages.

* cited by examiner

GRAPHENE-PROTECTED LEAD ACID BATTERIES

FIELD OF THE INVENTION

The present invention relates generally to the field of lead acid battery. In particular, the invention is directed to novel compositions and methods for producing a lead-acid battery with graphene-protected negative and/or positive electrode active materials.

BACKGROUND

Lead acid batteries were invented in the 1860's and the basic structure of a lead acid battery has changed little since then. However, advancements in materials and manufacturing processes continue to improve the energy density, power density, life (including calendar life and cycle life), and reliability.

Typically, lead acid batteries used in the recreational vehicle (RV) and marine Industries consist of two 6-volt batteries in series, or a single 12-volt battery. These batteries are constructed of several single cells connected in series wherein each cell produces approximately 2.1 volts. A six-volt battery has three single cells which, when fully charged, produce an output voltage of 6.3 volts. A twelve-volt battery has six single cells connected in series, producing a fully charged output voltage of 12.6 volts.

A lead acid battery cell consists of two lead plates: a positive plate covered with a paste of lead dioxide and a negative electrode made of sponge-like lead structure, with an electronically insulating material (separator) positioned between the negative electrode and the positive electrode. The flat lead plates in both electrodes are immersed in a pool of electrolyte consisting of water and sulfuric acid.

After some 150 years, lead acid batteries having improved performance features continue to evolve. Modern research and development work is primarily aimed at maximizing the specific power (watts per kilogram) over designated high rate discharge voltage-current profiles, and maximizing battery life, not only in environmental durability but also in cycle life (number of charge-discharge cycles).

The corrosion (mainly on the positive plate) and sulfation (on both the negative and positive plate) are the two key failure modes of lead acid batteries. The corrosion problem begins to accelerate either as temperatures rise about 20° C. and/or if the battery is left in a discharged state. Two main approaches have been followed to mitigate the effects of the corrosion process: developing more corrosion-resistant lead alloys and improving grid manufacturing processes that reduce the mechanical stresses in the as-manufactured grids. In order to improve the battery service life, battery engineers often design the lead alloy and vary the grid wire cross-sectional area for the purpose of changing the grid thickness and corresponding plate thickness. Thicker grids provide longer life, but usually at the expense of reduced power density and increased cost, weight, and volume.

The sulfation failure mode is associated with the formation of "hard lead sulfate." When a lead acid battery is left on open circuit stand, or kept in a partially or fully discharged state for a period of time, the lead sulfate formed in the discharge reaction recrystallizes to form larger and thicker lead sulfate crystals commonly referred to as hard lead sulfate. This non-conductive lead sulfate, being large and thick, blocks the conductive path needed for recharging. It is difficult for these crystals to convert back into the active materials in the charged state: lead in the negative electrode and lead dioxide in the positive electrode. Consequently, the battery capacity decays rapidly over time.

Even a well maintained battery will lose some capacity over time due to the continued growth of large and thick lead sulfate crystals that cannot be fully recharged during each recharge cycle. These sulfate crystals, of density 6.287 $g/cm^3$, are also larger in volume by about 37% than the original paste, so they mechanically deform the plate and push material apart. The resulting expansion and deformation of the plates also causes active material to separate from the electrodes with a corresponding loss of performance.

Sulfation is the main problem in recreational applications during battery storage when the season ends. For instance, boats, motorcycles, and snowmobiles lie dormant in their off-use period and, left uncharged, the lead acid battery discharges toward a zero % state-of-charge, resulting in progressive sulfation of the battery. Consequently, the battery cannot be recharged anymore, is irreversibly damaged, and must be replaced.

There are several additional drawbacks commonly associated with conventional lead acid batteries. Due to their inherent design and active material utilization limitations, conventional lead-acid batteries only provide relatively good cycle-life when less than about 80% of the rated capacity is used during each discharge event in an application. Such a battery suffers a significant decrease in the cycle life when 100% of the rated capacity is consumed during a discharge. Many new products now require a significant increase in cycle life. For instance, the batteries in hybrid electric vehicles (HEVs) operate in a High Rate Partial-State-of-Charge (PSoC) condition. Such an application is known to dramatically shorten the cycle life of a typical lead acid battery.

Another drawback of the lead-acid battery is the notion that the recharge time is significantly longer than competitive batteries, such as lithium-ion batteries. It would take from 8 to 16 hours to completely recharge a lead-acid battery used in an electric vehicle. A high charge rate is also essential to the operation of an uninterrupted power supply (UPS).

Still another drawback of the lead acid battery is the low specific energy density. For a 2.0 volt cell, the theoretical specific energy is approximately 167 watt-hours per kilogram of reactants (or 167 Wh/kg based on the total weight of reactants). However, a lead-acid cell in practice gives only 30-40 watt-hours per kilogram of battery cell (or 30-40 Wh/kg based on the total cell weight), due to the presence of the mass of non-active materials or components that add weights but not charge storage capacity to the cell. These non-active materials or components include water, grids and/or current collectors, flock, additives (e.g. an "expander" component), a separator, and battery casing, etc. Furthermore, in actual uses of the battery, some portion of the active materials may not be able to contribute to charge storage.

There is a need to increase the active material proportion relative to the non-active portion and to increase the active material utilization rate (i.e. by reducing or eliminating the non-contributing portion of the active materials).

Conventional processes for producing electrode plates for lead-acid batteries generally include mixing, curing and drying operations. In these operations, the active materials in the battery paste undergo chemical and physical changes that are needed for establishing the chemical and physical structure and resulting mechanical strength of the electrode plate. In a typical procedure, materials are added to paste mixing machines in the order of lead oxide, flock, water and sulfuric acid, which are then mixed, dispersed, and homogenized to a paste consistency.

The flock component is a fibrous material, usually composed of polyester, nylon or acrylic fibers, which is added optionally to the paste to increase the mechanical strength of the pasted plate. An "expander" component consisting of a mixture of barium sulfate, carbon black and lignosulfonate may be added to the negative electrode paste to improve the performance and cycle lifetime of the battery. During mixing, chemical reactions take place in the paste, producing basic lead sulfates; e.g. tribasic lead sulfate. The final paste composition is a mixture of basic lead sulfates, unreacted lead monoxide, and residual free lead particles.

Pasting is the process of making a lead acid battery plate. This paste is dispersed into a pasting machine, which applies the paste to a grid structure composed of a lead alloy. The pasted plates are generally surface dried in a tunnel dryer and then either stacked in columns or placed on racks. The stacked or racked plates are then placed in curing chambers. During the entire pasting and curing operation, the paste must have sufficient mechanical strength to avoid microcrack formation, which otherwise could increase internal electrical resistance. A high internal electrical resistance can limit rates of discharge and charging as well as result in localized heating during charging/discharging and increased chemical degradation of the active materials.

Some efforts have been made to reduce the high impedance of the battery and to accelerate the formation step (first charging step). These include adding carbon black to the paste, which requires adding surfactants in order to properly disperse the carbon black. Unfortunately, surfactants can create higher internal impedance. Additionally, regions of high impedance are present due to the non-homogeneous contact resistance of the powders and, consequently, an overvoltage during battery charging is often applied to overcome this high local impedance. The overvoltage in turn results in electrolysis of water, generating oxygen at the cathode which then rapidly degrades the carbon black. Thus, it is highly desirable to have a means to lower impedance in lead-acid batteries that can avoid overvoltage requirements for charging. A need also exists for a longer lasting conducting additive than carbon black for the electrode of a lead acid battery.

In summary, a need exists for a new type of lead acid battery that exhibits a higher energy density, higher power density, and a more stable or longer cycle life.

SUMMARY OF THE INVENTION

The present invention provides a lead acid battery that delivers a higher power density, higher energy density, and longer operating life. The battery comprises a negative electrode, a positive electrode comprising lead oxide, an electrolyte in physical contact with the negative electrode and the positive electrode, an optional separator positioned between the negative electrode and the positive electrode, wherein the negative electrode comprises a plurality of negative particulates of graphene-protected lead or lead alloy and wherein at least one of the negative particulates is formed of a single or a plurality of graphene sheets and a single or a plurality of fine lead or lead alloy particles or coating having a size (diameter or thickness) smaller than 10 μm (preferably smaller than 1 μm, and more preferably smaller than 100 nm), and the graphene sheets and the lead or lead alloy particles are mutually bonded or agglomerated into the particulate with at least a graphene sheet embracing or wrapping around the particulate, and wherein graphene is in an amount of at least 0.01% but less than 99% by weight (preferably less than 70%, and most preferably less than 50%) based on the total weight of the particulate. Preferably, the graphene amount is at least 1% by weight, more preferably at least 5%. Most preferably, the graphene amount is at least 1% by weight and no greater than 95% so that the active material (e.g. lead or lead alloy) is from 5% to 99% by weight.

Preferably, the negative particulates are substantially spherical or ellipsoidal in shape. Preferably, the electrolyte contains sulfuric acid in water at an acid concentration from 0.01 M to 10 M. In certain embodiments, the separator is selected from a porous film, paper, or mat of a polymer, glass, ceramic material, or a combination thereof. Preferably, the separator contains a mat of polymer fibers or glass fibers. The porous polymer film can be a plastic film, rubber film, or polymer composite film.

Although not required, the invented lead acid battery may further comprise a negative current collector and/or a positive current collector consisting essentially of a lead grid, a lead alloy grid, or a sheet of mat, paper, or porous film made of metal fibers, metal nano wires, carbon nanofibers, carbon nanotubes, carbon fibers, electro-spun conductive polymer fibers, carbonized electro-spun polymer fibers, metal-coated fibers, carbon-coated fibers, conductive polymer-coated fibers, conductive polymer fibers, or a combination thereof.

Preferably, the graphene comprises single-layer graphene or few-layer graphene, wherein said few-layer graphene is defined as a graphene platelet formed of less than 10 graphene planes and said graphene is selected from pristine graphene, graphene oxide, reduced graphene oxide, graphene fluoride, hydrogenated graphene, nitrogenated graphene, doped graphene, or chemically functionalized graphene.

In certain preferred embodiments, the negative particulates include a core-shell structure wherein the core contains one or multiple particles of lead or lead acid and said shell contain one or multiple sheets of graphene.

In some embodiments, the lead acid battery further comprises a carbon or graphite material in electronic contact with lead or lead alloy and a graphene sheet. Preferably, the lead acid battery further comprises a carbon or graphite material coated on or in contact with at least one of the lead or lead alloy particles, wherein the carbon or graphite material is selected from polymeric carbon, amorphous carbon, chemical vapor deposition carbon, coal tar pitch, petroleum pitch, meso-phase pitch, carbon black, coke, acetylene black, activated carbon, fine expanded graphite particle with a dimension smaller than 100 nm, artificial graphite particle, natural graphite particle, or a combination thereof. The polymeric carbon or amorphous carbon may be obtained from pyrolyzation of a polymer selected from the group consisting of phenol-formaldehyde, polyacrylonitrile, styrene-based polymers, cellulosic polymers, epoxy resins, and combinations thereof.

In certain preferred embodiments, the negative electrode further comprises a negative current collector and the plurality of negative particulates of graphene-protected lead or lead alloy form one or two negative electrode material layers coated on or bonded to the negative current collector. The negative current collector preferably comprises a metal grid or a sheet of mat, paper, or porous film made of conductive filaments selected from metal fibers, metal nano wires, carbon nanofibers, carbon nanotubes, carbon fibers, electro-spun conductive polymer fibers, carbonized electro-spun polymer fibers, metal-coated fibers, carbon-coated fibers, conductive polymer-coated fibers, conductive polymer fibers, or a combination thereof.

Preferably, in the invented lead acid battery, the lead oxide in the positive electrode is mixed with graphene to form a lead oxide-graphene mixture or composite structure.

In the invented lead acid battery having the aforementioned negative electrode, the positive electrode may also contain cathode active materials in a particulate form. Specifically, in certain preferred embodiments, the positive electrode comprises a plurality of positive particulates of graphene-protected lead oxide, wherein at least one of the positive particulates is formed of a single or a plurality of graphene sheets and a single or a plurality of fine lead oxide particles or coating having a size smaller than 10 μm (preferably smaller than 1 μm, more preferably smaller than 100 nm, and most preferably less than 20 nm) and the graphene sheets and the lead oxide particles or coating are mutually bonded or agglomerated into such a positive particulate with a graphene sheet or multiple graphene sheets embracing or wrapping around the positive particulate, and wherein the graphene is in an amount of at least 0.01% but less than 50% by weight based on the total weight of the positive particulate.

The invention also provides a lead acid battery comprising a negative electrode comprising lead or an lead alloy, a positive electrode, an electrolyte in physical contact with the negative electrode and the positive electrode, an optional separator positioned between the negative electrode and the positive electrode, wherein the positive electrode comprises a plurality of positive particulates of graphene-protected lead oxide and at least one of the positive particulates is formed of a single or a plurality of graphene sheets and a single or a plurality of fine lead oxide particles or coating having a size smaller than 10 μm (preferably smaller than 1 μm, more preferably smaller than 100 nm, and most preferably less than 20 nm), and the graphene sheets and the lead oxide particles or coating are mutually bonded or agglomerated into the positive particulate with at least a graphene sheet or multiple graphene sheets embracing or wrapping around the positive particulate, and wherein graphene is in an amount of at least 0.01% but less than 50% by weight based on the total weight of the positive particulate. Preferably, the graphene amount is at least 1% by weight but less than 20% by weight. Further preferably, the graphene amount is at least 5% by weight. Preferably, the positive particulate is substantially spherical or ellipsoidal in shape.

In the invented lead acid battery wherein graphene is used in the cathode and/or anode, the graphene material may contain single-layer graphene or few-layer graphene, wherein the few-layer graphene is defined as a graphene platelet formed of less than 10 graphene planes and the graphene material is selected from pristine graphene, graphene oxide, reduced graphene oxide, graphene fluoride, hydrogenated graphene, nitrogenated graphene, doped graphene, or chemically functionalized graphene.

In certain preferred embodiments, the positive particulates include a core-shell structure wherein the core contains one or multiple particles of lead oxide and the shell contain one or multiple sheets of graphene.

In certain embodiments, the positive electrode further comprises a positive current collector and the plurality of positive particulates of graphene-protected lead oxide form one or two positive electrode material layers coated on or bonded to the positive current collector. The positive current collector preferably comprises a metal grid or a sheet of mat, paper, or porous film made of conductive filaments selected from metal fibers, metal nano wires, carbon nanofibers, carbon nanotubes, carbon fibers, electro-spun conductive polymer fibers, carbonized electro-spun polymer fibers, metal-coated fibers, carbon-coated fibers, conductive polymer-coated fibers, or a combination thereof.

In addition, the invention provides an electrode for use in a lead acid battery, the electrode comprising a plurality of particulates of graphene-protected lead, lead alloy, or lead oxide and at least one of the particulates is formed of a single or a plurality of graphene sheets and a single or a plurality of fine lead, lead alloy, or lead oxide particles or coating having a size smaller than 10 μm (preferably less than 1 μm, more preferably less than 100 nm, and most preferably less than 20 nm), and the graphene sheets and the lead, lead alloy, or lead oxide particles or coating are mutually bonded or agglomerated into the particulate with a graphene sheet or multiple graphene sheets embracing or wrapping around the particulate, and wherein the graphene is in an amount of at least 0.01% but less than 95% by weight based on the total weight of said particulate.

The invention also provides a process for producing the aforementioned lead acid battery, wherein the negative particulates are prepared from a process comprising (a) a step of preparing a suspension of graphene sheets dispersed in a liquid medium and mixing particles of lead or an lead alloy in the suspension to form a multi-component suspension, wherein graphene is selected from pristine graphene, graphene oxide, reduced graphene oxide, graphene fluoride, hydrogenated graphene, nitrogenated graphene, doped graphene, or chemically functionalized graphene; and (b) a step of forming the multi-component suspension into a plurality of micro-droplets (typically 100 nm to 10 μm) and removing the liquid medium in such a manner that the particles of lead or lead alloy and the graphene sheets are assembled together to form the particulates. Preferably, the step of removing the liquid medium is conducted using a spray-drying, spray-pyrolysis, fluidized-bed drying, atomization or aerosolizing step.

In some embodiments, the negative particulates are prepared from a procedure comprising (a) a step of preparing a suspension of graphene sheets dispersed in a liquid medium and mixing particles of a precursor to lead in said suspension to form a multi-component suspension, wherein graphene is selected from pristine graphene, graphene oxide, reduced graphene oxide, graphene fluoride, hydrogenated graphene, nitrogenated graphene, doped graphene, or chemically functionalized graphene; (b) a step of forming the multi-component suspension into a plurality of micro-droplets and removing the liquid medium in such a manner that said lead or lead alloy particles and the graphene sheets are assembled together to form precursor particulates; and (c) chemically or thermally converting the precursor particulates to the negative particulates. Preferably, step (b) includes using a spray-drying, spray-pyrolysis, ultrasonic spraying, fluidized-bed drying, atomization, or aerosolizing step The present invention also provides a process for producing a lead acid battery, wherein the particulates are prepared from a process comprising: (a) preparing a precursor mixture suspension of a graphene material with a precursor to lead (e.g. a chemical species containing lead in its formula) dispersed in a liquid medium, wherein the graphene material is selected from pristine graphene, graphene oxide, reduced graphene oxide, graphene fluoride, hydrogenated graphene, nitrogenated graphene, doped graphene, or chemically functionalized graphene; (b) dispensing and forming the precursor mixture suspension into precursor particulates, and (c) thermally and/or chemically converting the precursor particulates into particulates of graphene-protected lead. Preferably, step (b) comprises an atomization, aerosolizing, spray-drying, ultrasonic spraying, spray-pyrolysis, or fluidized bed drying procedure.

DETAILED DESCRIPTION OF PREFERRED EMBODIMENTS

This invention is related to lead acid batteries that deliver a higher power density, higher energy density, and longer operating life as compared to prior art lead acid batteries. The shape of a lead acid battery can be cylindrical, square, button-like, etc. The present invention is not limited to any battery shape or configuration.

Unless otherwise specified, in the instant specification and claims, lead oxide refers to lead dioxide ($PbO_2$), not lead monoxide (PbO).

Figure 1:
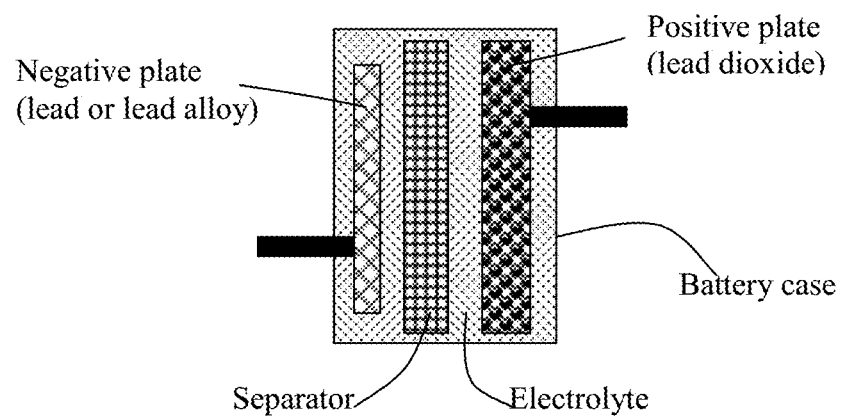
FIG. 1 Schematic of a prior art lead acid battery cell.

As illustrated in FIG. 1, a conventional lead acid battery cell consists of two lead plates (a positive plate having a lead alloy grid covered with a paste of lead oxide (i.e. lead dioxide, $PbO_2$), a negative plate made of sponge-like lead covering a lead alloy grid), an electronically insulating material (separator) positioned between the negative plate (negative electrode) and the positive plate (positive electrode), electrolyte (typically a liquid, gel, or polymer electrolyte containing water and sulfuric acid), and a battery case. The flat lead plates in both electrodes are immersed in a pool of electrolyte essentially consisting of water and sulfuric acid. Property modifier additives (e.g. "flock" and/or "expander" components) may be optionally added to electrolyte.

As briefly recited in the Background section of instant specification, there are several problems associated with conventional lead acid batteries; some of these are 100+ years old issues. For instance, the corrosion and sulfation are the two key failure modes of all lead acid batteries. Many efforts have been made to solve these problems, but only with limited success.

The sulfation failure mode is due to the formation of "hard lead sulfate" during the battery operations and, particularly, during the dormant periods of the battery. When a lead acid battery is disconnected from the external load, or kept in a partially or fully discharged state for a period of time, the lead sulfate formed in the discharge reaction recrystallizes to form larger and thicker lead sulfate crystals commonly referred to as hard lead sulfate. This non-conductive lead sulfate, being large and thick, blocks the conductive pathways needed for recharging. As such, during a subsequent re-charge, it is difficult for these crystals to convert back into the active materials (i.e. lead in the negative electrode and lead dioxide in the positive electrode in the charged state).

Even a well maintained battery will lose some capacity over time due to the continued growth of large and thick lead sulfate crystals that cannot be fully converted during each recharge cycle. In addition, these sulfate crystals, of density 6.287 $g/cm^3$, are also larger in volume by about 37% than the original paste, so they mechanically deform the plate and push material apart. The resulting expansion and deformation of the plates also causes active material to separate from the electrodes, leading to a continuous loss in battery capacity and other performance characteristics.

After an extensive and in-depth study, the applicants have developed a new form of lead acid batteries having new negative electrode and/or new positive electrode materials and structures. This new battery has effectively solved these two and other long-standing problems and, consequently, exhibits a higher power density, higher energy density, and longer operating life as compared to conventional lead acid batteries.

Figure 2:
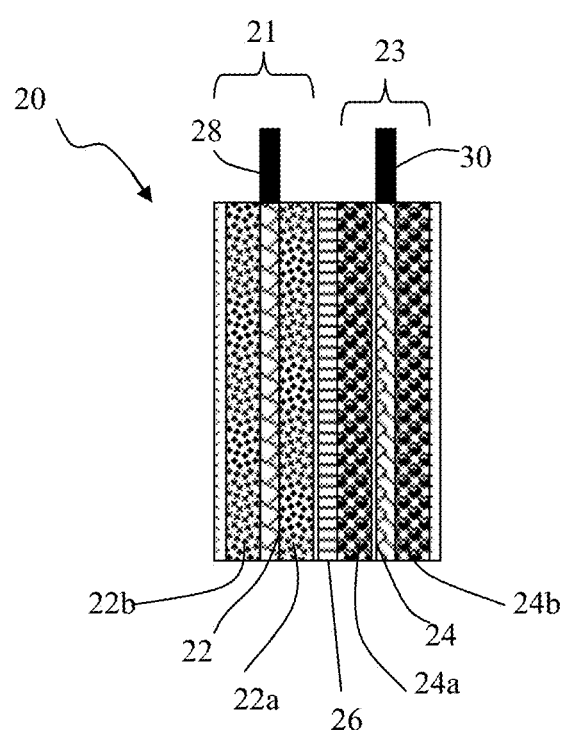
FIG. 2 Schematic of a lead acid battery cell according to a preferred embodiment of instant invention.

Illustrated in FIG. 2 is a lead acid battery cell according to a preferred embodiment of the instant invention. The battery cell 20 comprises a negative electrode 21, a porous separator 26, and a positive electrode 23, which are all immersed in an electrolyte (e.g. a liquid, gel, or polymer electrolyte containing sulfuric acid and water).

In a preferred embodiment, the negative electrode 21 comprises a negative current collector 22, two layers (22a and 22b) of particulate-based negative electrodes containing graphene-protected lead or lead alloy particles coated on or bonded to the negative current collector 22, and a negative terminal tab 28 in contact with, bonded to, or integral with the negative current collector 22. This tab 28 is intended for connection to an external circuit (e.g. containing a bulb or an electronic device). A binder may be used to bond negative particulates together to form a negative particulate layer of structural integrity and to bond such a layer to the negative current collector. There can be just one layer (either 22a or 22b), instead of two.

In a preferred embodiment, the positive electrode 23 comprises a positive current collector 24, two layers (24a and 24b) of positive particulates containing graphene-protected lead oxide particles coated on or bonded to the positive current collector 24, and a positive terminal tab 30 in contact with, bonded to, or integral with the positive current collector 24. This tab 30 is intended for connection to an external circuit. A binder may be used to bond positive particulates together to form a positive particulate layer of structural integrity and to bond such a layer to the positive current collector. There can be just one layer (24a or 24b) instead of two.

The negative or positive current collector may be a simple grid (e.g. Pb or lead alloy grid, as in a conventional lead acid battery, or a grid made out of other types of metal) or a sheet of mat, paper, or porous film made of conductive filaments (e.g. metal fibers, metal nano wires, carbon nanofibers, carbon nanotubes, carbon fibers, electro-spun conductive polymer fibers, carbonized electro-spun polymer fibers, metal-coated fibers, carbon-coated fibers, conductive polymer-coated fibers, or a combination thereof).

Figure 3:
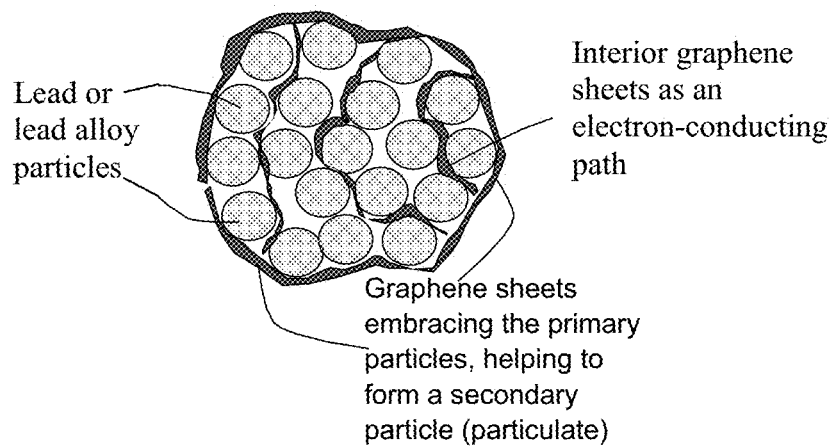
FIG. 3(A) Schematic of a graphene-enhanced anode particulate according to a preferred embodiment of the present invention. The active material particles can be lead or lead oxide in the negative electrode or lead oxide in the positive electrode.
FIG. 3(B) Schematic of another particulate according to another preferred embodiment of the present invention (containing some amount of a carbon or graphite material).
Figure 3:
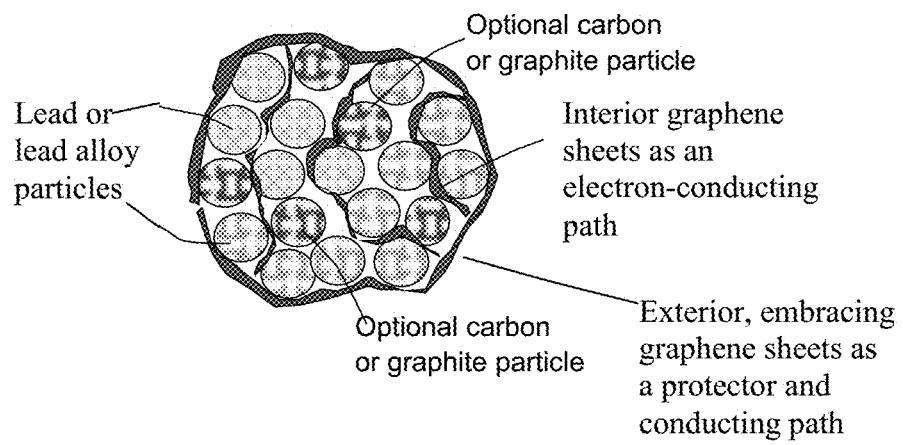

The present invention also provides a graphene-protected negative particulate (secondary particle) for use as a lead acid battery negative electrode material, wherein the negative particulate is formed of a single or a plurality of graphene sheets and a plurality of fine lead or lead alloy particles (primary particles, with a size smaller than 10 μm, preferably smaller than further preferably smaller than 100 nm, and most preferably smaller than 20 nm) or coating (having a coating thickness smaller than 10 μm, preferably smaller than further preferably smaller than 100 nm, and most preferably smaller than 20 nm). The graphene sheets and the lead or lead alloy particles are mutually bonded or agglomerated into the negative particulate with a graphene sheet or multiple graphene sheets embracing the lead or lead alloy particles (as illustrated in FIG. 3(A)). Graphene is in an amount of at least 0.01% by weight (preferably at least 0.1% by weight and more preferably at least 1% by weight, but typically less than 99% by weight and preferably less than 95% by weight) and the lead or lead alloy material is in an amount of at least 0.1% by weight (preferably at least 5%, more preferably at least 30%, and most preferably at least 70%), all based on the total weight of the negative particulate.

The present invention also provides a graphene-protected positive particulate (secondary particle) for use as a lead acid battery positive electrode material, wherein the positive particulate is formed of a single or a plurality of graphene sheets and a plurality of fine lead oxide particles (primary particles, with a size smaller than 10 μm, preferably smaller than and most preferably smaller than 100 nm) or lead oxide coating (having a coating thickness smaller than 10 μm, preferably smaller than and most preferably smaller than 100 nm). The graphene sheets and the lead or lead alloy particles are mutually bonded or agglomerated into the positive particulate with a graphene sheet or multiple graphene sheets embracing the lead oxide particles. Graphene is in an amount of at least 0.01% by weight (preferably at least 0.1% by weight and more preferably at least 1% by weight, but typically less than 99% by weight, more typically less than 70%, and most typically less than 50%) and the lead oxide is in an amount of at least 0.1% by weight, all based on the total weight of the particulate.

Preferably, the negative or positive particulates are approximately spherical or ellipsoidal in shape. The graphene material in or on the particulate preferably comprises single-layer graphene or few-layer graphene, wherein few-layer graphene is defined as a graphene platelet formed of less than 10 graphene planes of carbon atoms. In addition to lead or lead alloy particles (in the negative electrode) or lead oxide particles (in the positive electrode), a carbon or graphite material may be added to the interior of the particulate (e.g. as illustrated in FIG. 3(B)). This carbon or graphite material in a fine particle or thin coating form provides additional protection (additional electron-conducting paths, additional cushioning effect, and additional shielding against undesirable reactions with electrolyte).

A nano graphene platelet (NGP) or graphene sheet is composed of one basal plane (graphene plane) or multiple basal planes stacked together in the thickness direction. In a graphene plane, carbon atoms occupy a 2-D hexagonal lattice in which carbon atoms are bonded together through strong in-plane covalent bonds. In the c-axis or thickness direction, these graphene planes may be weakly bonded together through van der Waals forces. An NGP can have a platelet thickness from less than 0.34 nm (single layer) to 100 nm (multi-layer). For the present electrode use, the preferred thickness is <10 nm and most preferably <3 nm or 10 layers). The presently invented graphene-enhanced particulate preferably contains mostly single-layer graphene, but could make use of some few-layer graphene (less than 10 layers). The graphene sheet may contain a small amount (typically <25% by weight) of non-carbon elements, such as hydrogen, fluorine, and oxygen, which are attached to an edge or surface of the graphene plane.

Graphene sheets may be oxidized to various extents during their preparation, resulting in graphite oxide (GO) or graphene oxide. Hence, in the present context, graphene preferably or primarily refers to those graphene sheets containing no or low oxygen content; but, they can include GO of various oxygen contents. Further, graphene may be fluorinated to a controlled extent to obtain graphene fluoride.

The NGPs may be obtained from exfoliation and platelet separation of a natural graphite, synthetic graphite, highly oriented pyrolytic graphite, graphite fiber, carbon fiber, carbon nano-fiber, graphitic nano-fiber, spherical graphite or graphite globule, meso-phase micro-bead, meso-phase pitch, graphitic coke, or graphitized polymeric carbon.

Figure 4:
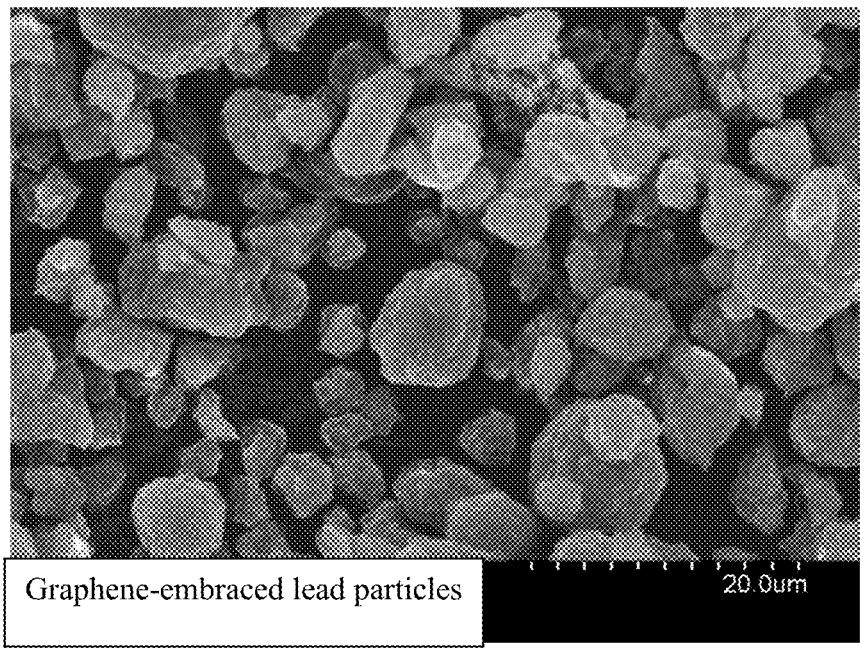
FIG. 4 SEM image of graphene-enhanced particulates comprising lead particles and graphene sheets inside the particulate and exterior graphene sheets on the exterior surface of the particulate, according to one preferred embodiment of the present invention.
Figure 6A:
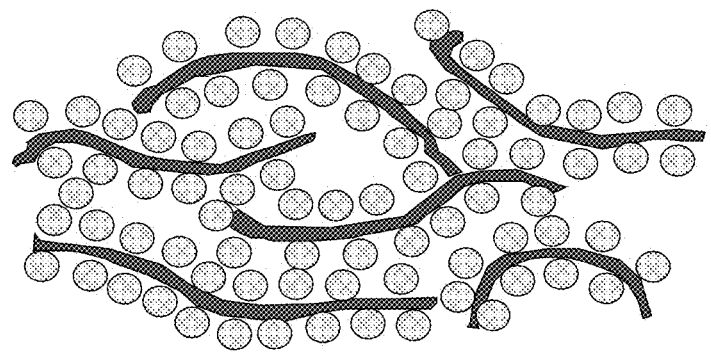
FIG. 6(A) Schematic of prior art mixture of graphene sheets and particles of an electrode active material.
Figure 6B:
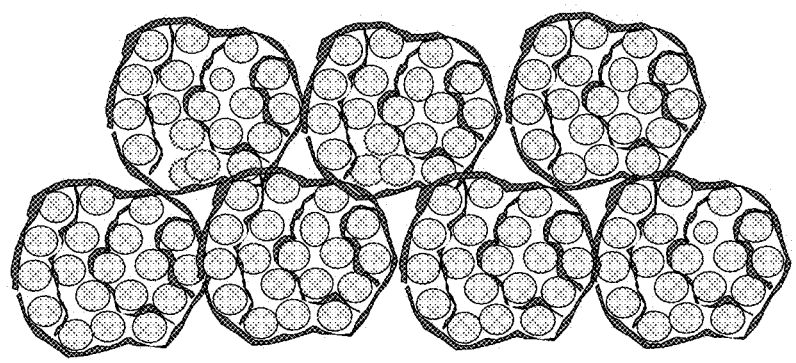
FIG. 6(B) Schematic of presently invented graphene-enhanced particulates packed together to form a 3D network of electron-conducting pathways.

FIG. 4 shows graphene-protected particulates comprising graphene sheets in and around the particulate. Exterior graphene sheets embrace and protect the primary particles (lead particles) to form secondary particles (particulates) that are easier to handle in a real anode production environment. The notion that the exterior surface of the particulate is embraced with highly conductive graphene sheets implies that these exterior graphene sheets, along with the interior graphene sheets (inside the particulate), can naturally form a 3-D network of electron-conducting paths when multiple particulates are packed together in an electrode (e.g. as illustrated in FIG. 6B)).

Figure 5:
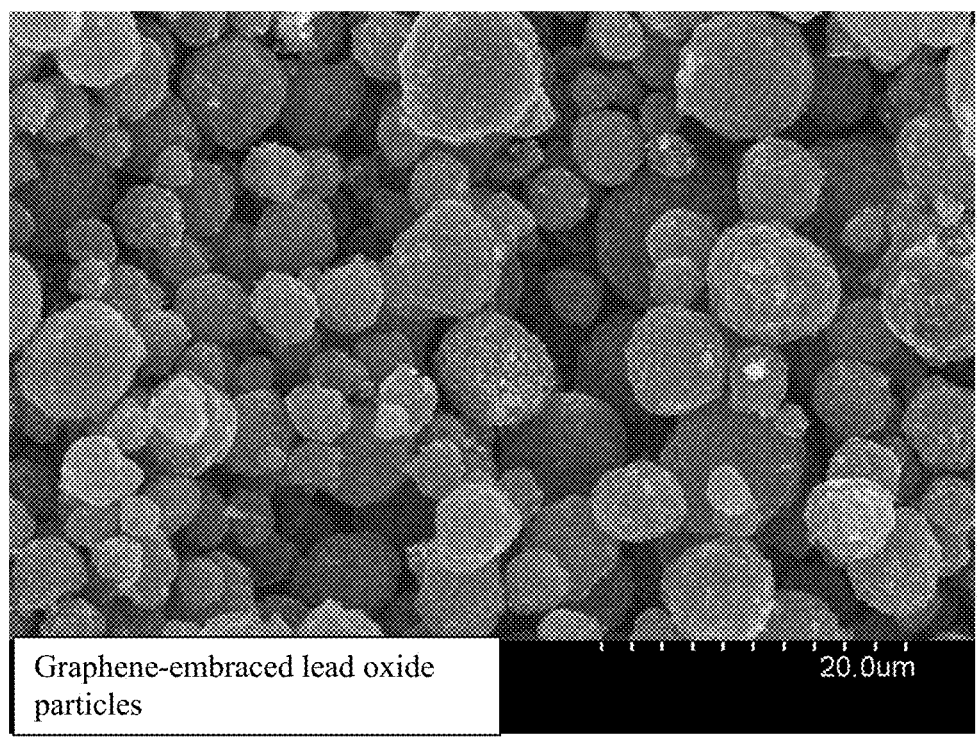
FIG. 5 SEM image of graphene-enhanced particulates; graphene sheets embrace and protect the primary particles to form secondary particles (particulates) that are easier to handle in a real anode production environment.

FIG. 5 shows an SEM image of graphene-enhanced particulates containing therein lead oxide, internal graphene sheets, and carbon/graphite particles embraced by graphene sheets. Graphene sheets embrace and protect the primary particles (e.g. lead oxide) to form secondary particles (particulates) that are more uniform in particle sizes and are larger in average size (~10 μm) than the primary particles (sub-micron or nano-scaled). These more or less spherical particles, being micrometer sized, can be easily handled and made into electrodes using existing battery electrode coating machines. These particulates are found to lead to electrodes that have a higher tap density (weight per volume of the electrode), which is a very important parameter for an electrode. In contrast, it is found to be very difficult to directly disperse nano materials, such as graphene sheets mixed with lead or lead oxide particles, to form an electrode. Furthermore, such a simple mixture of graphene sheets and lead or lead oxide particles do no readily form a 3D network of electron-conducting paths (as illustrated in FIG. 6(A)).

In a preferred embodiment, the graphene material is selected from pristine graphene, graphene oxide, reduced graphene oxide, graphene fluoride, graphene chloride, graphene bromide, graphene iodide, hydrogenated graphene, nitrogenated graphene, chemically functionalized graphene, or a combination thereof. The starting graphitic material for producing any one of the above graphene materials may be selected from natural graphite, artificial graphite, meso-phase carbon, meso-phase pitch, meso-carbon micro-bead, soft carbon, hard carbon, coke, carbon fiber, carbon nano-fiber, carbon nano-tube, or a combination thereof.

For instance, the graphene oxide (GO) may be obtained by immersing powders or filaments of a starting graphitic material (e.g. natural graphite powder) in an oxidizing liquid medium (e.g. a mixture of sulfuric acid, nitric acid, and potassium permanganate) in a reaction vessel at a desired temperature for a period of time (typically from 0.5 to 96 hours, depending upon the nature of the starting material and the type of oxidizing agent used). The resulting graphite oxide particles may then be subjected to thermal exfoliation or ultrasonic wave-induced exfoliation to produce GO sheets.

Pristine graphene may be produced by direct ultrasonication (also known as liquid phase production) or supercritical fluid exfoliation of graphite particles. These processes are well-known in the art. Multiple pristine graphene sheets may be dispersed in water or other liquid medium with the assistance of a surfactant to form a suspension.

Fluorinated graphene or graphene fluoride is herein used as an example of the halogenated graphene material group. There are two different approaches that have been followed to produce fluorinated graphene: (1) fluorination of pre-synthesized graphene: This approach entails treating graphene prepared by mechanical exfoliation or by CVD growth with fluorinating agent such as $XeF_2$, or F-based plasmas; (2) Exfoliation of multilayered graphite fluorides: Both mechanical exfoliation and liquid phase exfoliation of graphite fluoride can be readily accomplished [F. Karlicky, et al. "*Halogenated Graphenes: Rapidly Growing Family of Graphene Derivatives*" ACS Nano, 2013, 7 (8), pp 6434-6464].

Interaction of $F_2$ with graphite at high temperature leads to covalent graphite fluorides $(CF)_n$ or $(C_2F)_n$, while at low temperatures graphite intercalation compounds (GIC) $C_xF$ ($2 \le x \le 24$) form. In $(CF)_n$ carbon atoms are sp3-hybridized and thus the fluorocarbon layers are corrugated consisting of trans-linked cyclohexane chairs. In $(C_2F)_n$ only half of the C atoms are fluorinated and every pair of the adjacent carbon sheets are linked together by covalent C—C bonds. Systematic studies on the fluorination reaction showed that the resulting F/C ratio is largely dependent on the fluorination temperature, the partial pressure of the fluorine in the fluorinating gas, and physical characteristics of the graphite precursor, including the degree of graphitization, particle size, and specific surface area. In addition to fluorine ($F_2$), other fluorinating agents may be used, although most of the available literature involves fluorination with $F_2$ gas, sometimes in presence of fluorides.

For exfoliating a layered precursor material to the state of individual layers or few-layers, it is necessary to overcome the attractive forces between adjacent layers and to further stabilize the layers. This may be achieved by either covalent modification of the graphene surface by functional groups or by non-covalent modification using specific solvents, surfactants, polymers, or donor-acceptor aromatic molecules.

The process of liquid phase exfoliation includes ultrasonic treatment of a graphite fluoride in a liquid medium.

The nitrogenation of graphene can be conducted by exposing a graphene material, such as graphene oxide, to ammonia at high temperatures (200-400° C.). Nitrogenated graphene could also be formed at lower temperatures by a hydrothermal method; e.g. by sealing GO and ammonia in an autoclave and then increased the temperature to 150-250° C. Other methods to synthesize nitrogen doped graphene include nitrogen plasma treatment on graphene, arc-discharge between graphite electrodes in the presence of ammonia, ammonolysis of graphene oxide under CVD conditions, and hydrothermal treatment of graphene oxide and urea at different temperatures.

Once individual sheets of a graphene material are made, several methods can be used to prepare the negative or positive particulates, their respective negative or positive electrodes, and the resulting lead acid batteries: (a) direct mixing of lead or lead alloy particles (for the negative electrode) or lead oxide particles (for the positive electrode) with graphene sheets, followed by particulate formation; (b) mixing of precursor species to lead or lead alloy (for the negative electrode) or precursor species to lead oxide (for the positive electrode) with graphene sheets, followed by the formation of precursor particulates (containing precursor species embraced and protected by graphene sheets) and chemical or thermal conversion of the precursor species into lead or lead oxide inside the protecting graphene sheets; and (c) formation of precursor particulates (containing lead sulfate or lead basic sulfate species embraced and protected by graphene sheets), implementing these precursor particulates in the negative electrode and the positive electrode, constructing a lead acid battery, and then electrochemical conversion of lead sulfate species into lead in the negative electrode and lead oxide in the positive electrode.

Method (a) typically involves mixing lead or lead alloy particles (for the negative electrode) or lead oxide particles (for the positive electrode) with graphene sheets in a liquid medium to form a suspension, followed by dispensing and drying the suspension using a droplet-forming procedure, such as spray-drying, atomization or aerosol forming, ultrasonic spraying, or airjet drying, to form the negative particulates or positive particulates. Multiple negative particulates are then packed together, optionally with a resin binder, to form a layer coated on one primary surface of a current collector, or two layers coated on both primary surfaces of a current collector to form a negative electrode (e.g. as illustrated as 21 in FIG. 2). Multiple positive particulates are packed in a similar manner to form a positive electrode (e.g. 23 in FIG. 2). By laminating a negative electrode, a porous separator, and a positive electrode together and packing this laminate, along with a liquid or gel electrolyte, inside a case, one obtains a lead acid battery cell.

Method (b) involves mixing precursor species to lead (for the negative electrode) or precursor species to lead oxide (for the positive electrode) with graphene sheets to form a suspension, followed by dispensing and drying the suspension using a droplet-forming procedure, such as spray-drying, atomization or aerosol forming, ultrasonic spraying, or airjet drying, to form the precursor negative particulates or precursor positive particulates (containing precursor species embraced and protected by graphene sheets). These steps are followed by chemical or thermal conversion of the precursor species into lead or lead oxide inside the protecting graphene sheets to form the desired negative particulates or positive particulates. Examples of these precursor species are lead monoxide, lead monosulfide, and their mixtures.

For instance, a mixture of the lead monoxide and the lead monosulfide, when heated, forms the lead metal. The precursor particulates containing lead sulfide and some carbon material (e.g. coke or carbonized resin) may be roasted in the air, the main reaction occurring is oxidation of lead sulfide with oxygen in the presence of graphene sheets: $2PbS+3O_2 \rightarrow 2PbO+2SO_2\uparrow$. This reaction releases heat once it gets started. This lead monoxide may be reduced (by placing the particulates in a coke-fired blast furnace) to the lead metal by a reaction with coke or carbonized resin in the presence of graphene sheets: $2PbO+C \rightarrow Pb+CO_2\uparrow$.

The reader might ask why we bother to use the indirect mixing approach that begins with mixing precursor species (precursor to lead or precursor to lead oxide) instead of directly mixing lead or lead oxide with graphene sheets (as in Method (a)). The answer to this question is the notion that we have surprisingly observed the presence of graphene sheets helping to significantly reduce the particle sizes or coating thickness when the new lead metal or lead oxide is formed from precursor species, presumably due to the graphene sheets serving as heterogeneous nucleation sites for the lead or lead oxide crystals. We have further surprisingly observed that these small sizes (typically 5 nm to 500 nm, more typically 10 nm to 100 nm) are highly beneficial to the cycle stability (exceptional reversibility of sulfation) and power density or high-rate capability of the lead acid batteries. Smaller crystal sizes imply faster reactions and, hence, higher power densities and high-rate capabilities. Due to small crystal sizes, all lead sulfate can be readily converted back to lead or lead oxide during re-charge and all lead or lead oxide can be fully converted to lead sulfate during discharge. This implies a nearly perfect active material utilization rate and, hence, exceptional energy density. These features are truly unexpected and are of high utility value.

Method (c) includes forming precursor particulates (containing lead sulfate, $PbSO_4$, or lead basic sulfate species embraced and protected by graphene sheets) using suspension preparation, suspension dispensing and drop formation, and drying procedures, such as spray drying described above. A number of lead basic sulfates (e.g. $PbSO_4.PbO$; $PbSO_4.2PbO$; $PbSO_4.3PbO$; and $PbSO_4.4PbO$) can be used as precursor active materials. As one example, the starting material to the precursor active material can be a mixture of lead oxide, red lead, litharge, water and dilute sulfuric acid.

These graphene-protected lead sulfate or lead basic sulfate particulates are then made into electrode layers bonded onto a current collector using a slurry drying process. The resulting two-layer structures (if coated onto one side of a current collector) or three-layer structures (if coated onto both sides) are then included as the negative electrode or the positive electrode of a lead acid battery. With liquid electrolyte in place, this lead acid battery is then subjected to a first charging step (called "formation" or "forming") to effect the electrochemical conversion of lead sulfate species into lead in the negative electrode and lead oxide in the positive electrode. This may be understood from the following three reactions (Eq. 1-Eq. 3):

Negative Electrode Reaction:

$$Pb(s)+HSO^-_4(aq) \leftrightarrow PbSO_4(s)+H^+(aq)+2e^- \quad \text{(Eq. 1)}$$

During the first charging step, lead sulfate, $PbSO_4(s)$, in the right hand side of Eq. 1 reacts with proton and electrons to become $Pb(s)$ and $HSO^-_4(aq)$ in the negative electrode. In the instant lead acid battery, large numbers of very small lead crystals or thin coating of lead crystals are deposited on graphene surfaces in the negative electrode. During the subsequent discharge step, the reaction in Eq. 1 is reversed, releasing two electrons that move through the external circuit to power a load (e.g. a light bulb) or a device. These fine lead crystals or coating are essentially fully transformed back into lead sulfate during the discharge cycle. During the subsequent recharge cycle, essentially all the lead crystals and coating are fully converted back to lead, leaving behind no un-converted lead sulfate. In other words, the presence of graphene sheets in a particulate form enables fully reversible transformation of all reactants, preventing the formation of "hard lead sulfate". This ensures good cycle life (very large number of cycles without any significant capacity decay) and high active material utilization efficiency (high energy density). Small crystals also imply faster reactions, enabling higher power density.

Positive Electrode Reaction:

$$PbO_2(s)+HSO^-_4(aq)+3H^+(aq)+2e^- \leftrightarrow PbSO_4(s)+2H_2O \quad \text{(Eq. 2)}$$

During the first charging step, lead sulfate, $PbSO_4(s)$, in the right hand side of Eq. 2 reacts with water to become $PbO_2(s)$, $HSO^-_4(aq)$, $3H^+(aq)$, and $2e^-$ in the positive electrode. $PbO_2(s)$ is deposited preferentially on the surfaces of graphene sheets in the positive electrode. Again, we have surprisingly observed that the presence of graphene sheets in the positive electrode help to significantly reduce the particle sizes or coating thickness of lead oxide crystals derived from precursor lead sulfate, presumably due to the graphene sheets serving as heterogeneous nucleation sites for lead oxide crystals. Again, these smaller lead oxide crystals result in superior cycle stability (longer cycle life), high energy density, and high power density of the lead acid battery.

The total reaction can be written as:

$$Pb(s)+PbO_2(s)+2H_2SO_4(aq) \leftrightarrow 2PbSO_4(s)+2H_2O(l) \quad \text{(Eq. 3)}$$

The spray-drying, atomization or aerosol forming, or ultrasonic spraying of a suspension containing graphene and lead, precursor to lead, lead oxide, or precursor to lead oxide tends to result in particulates that are in a core-shell structure if the solid content in the suspension is sufficiently low (e.g., typically when lower than 2% by weight and more typically lower than 1% by weight). The core-shell structure contains a single electrode active material particle or just 2 or 3 particles as the core, which is embraced by one or multiple graphene sheet(s) as the shell.

As an example, the process of producing graphene-enhanced particulates comprises (i) preparing a precursor mixture of graphene (or graphite, a precursor to graphene) with an electrode active material (e.g. lead) or a precursor to the active material (e.g. lead sulfide); and (ii) thermally and/or chemically converting the precursor mixture to the graphene-enhanced particulates. Described in more detail, the process entails:

(a) dispersing or immersing a graphite material (e.g., graphite powder) in a mixture of an intercalant and an oxidant (e.g., concentrated sulfuric acid and nitric acid, respectively) to obtain a graphite intercalation compound (GIC) or graphite oxide (GO);

(b) exposing the resulting GIC or GO to a thermal shock, preferably in a temperature range of 600-1,100° C. for a short period of time (typically 15 to 60 seconds), to obtain exfoliated graphite or graphite worms; and (c) dispersing exfoliated graphite in a liquid (e.g. water) and mechanically separating individual graphene sheets from graphite worms using, for instance, a high-shear mixer or an ultrasonicator to obtain a graphene or graphene precursor suspension; or, alternatively, (d) re-dispersing the exfoliated graphite to a liquid medium containing an acid (e.g., sulfuric acid), an oxidizing agent (e.g. nitric acid), or an organic solvent (e.g., NMP) at a desired temperature for a duration of time until the exfoliated graphite is converted into graphene oxide or graphene dissolved in the liquid medium. The acid is preferably a weak acid (such as diluted sulfuric acid) or a more environmentally benign acid, such as formic acid, acetic acid, citric acid, carboxylic acid, and combinations thereof. The exfoliated graphite, when dispersed in these acids, was gradually dispersed and essentially dissolved to form a graphene or graphene oxide solution or suspension. Although not a required operation, stirring, mechanical shearing, or ultrasonication can be used to accelerate the dispersion and dissolution step;

(e) dispersing a negative electrode active material (lead or lead alloy) or a precursor to a negative active material in the graphene or graphene precursor solution or suspension prepared in step (c) or step (d) to obtain a precursor mixture suspension; and (f) dispensing the suspension in a droplet form and drying the suspension droplets into solid particulates, and thermally and/or chemically converting the precursor particulates to the graphene-enhanced negative particulates.

Positive particulates can be produced in a similar manner.

If the precursor mixture contains a precursor to lead (e.g., lead sulfide being a precursor to lead nano particles), the particulates can be heated to obtain the particulates that contain primary lead particles therein (e.g., at 1,400° C.). If the precursor mixture contains a precursor to graphene (e.g. graphene oxide), the precursor may be subjected to a chemical or thermal reduction. A heat treatment at a temperature of preferably 500-1,000° C. for 1-2 hours would serve to eliminate a majority of the oxygen content from the graphene planes.

In step (e), particles of a carbon or graphite material may be added along with the active material particles. Alternatively, the active material particles may be coated with a thin layer of carbon before they are mixed with the graphene suspension. For instance, micron-, sub-micron-, or nano-scaled lead particles may be mixed into a solution containing a carbon precursor (e.g. sugar in water or un-cured phenolic resin in a solvent). The liquid component is then removed from the resulting mixture suspension or paste to obtain sugar- or resin-coated lead particles. These coated particles are then heat-treated at a temperature of 500-1,000° C. to obtain carbon-coated lead particles. These particles are then added to the graphene suspension.

Hence, another embodiment of the present invention is a process for preparing the presently invented graphene-enhanced particulates. In one preferred embodiment, the process comprises: (a) preparing a precursor mixture of graphene or graphene precursor with an active material or active material precursor in a droplet form; and (b) thermally and/or chemically converting the precursor mixture to the graphene-enhanced particulate.

The step of preparing a precursor mixture may comprise preparing a suspension of graphene or graphene precursor (e.g. graphene oxide or graphene fluoride) in a liquid medium and mixing an active material or active material precursor in the suspension to form a multi-component suspension. The process further comprises a step of droplet-forming and drying the multi-component suspension to form the precursor mixture in a particulate form.

The step of droplet-forming and drying the multi-component suspension to form the precursor mixture may be conducted using a spray-drying, spray-pyrolysis, fluidized-bed drying procedure, or any step that involves atomizing or aerosolizing the suspension. The step of converting may comprise a sintering, heat-treatment, spray-pyrolysis, or fluidized bed drying or heating procedure. The step of converting may comprise a procedure of chemically or thermally reducing the graphene precursor to reduce or eliminate oxygen or fluorine content and other non-carbon elements of the graphene precursor, which graphene precursor may contain graphene oxide or graphene fluoride. Upon conversion, the graphene in the particulate generally has an oxygen or fluorine content typically less than 5% by weight, more generally from 0.01% to 2%.

As another preferred embodiment, the process may begin with the production of a precursor solution or suspension of pristine graphene (non-oxidized graphene) directly from graphite particles, which is followed by the addition of an active material or precursor to the active material to this solution or suspension to obtain a precursor mixture. The production of a precursor solution or suspension may include the following steps:

(a) Preparing a suspension containing pristine nano graphene sheets (NGPs) dispersed in a liquid medium using, for instance, direct ultrasonication (e.g., a process disclosed by us in Pat. Publication No. US20080279756 (Nov. 13, 2008));

(b) Optionally removing some of the liquid from the suspension;

(c) Adding a desired amount of an active material or a precursor to an active material to obtain a precursor mixture suspension;

(d) Removing the liquid from the suspension to obtain a precursor mixture solid in a droplet form; and (e) Thermally and/or chemically converting the precursor mixture solid to the graphene-enhanced particulates.

For the preparation of an electrode, multiple graphene-enhanced particulates are mixed with a binder solution (e.g., PVDF in NMP) to obtain a slurry or paste. A desired amount of the slurry or paste is then coated onto a current collector, allowing the liquid to evaporate and leaving behind an electrode bonded to a surface of a current electrode. For examples, particulates containing lead or lead oxide and graphite particles embraced by graphene sheets may be added to a solution containing a solvent (NMP). The resulting paste may be coated onto a lead grid or aluminum foil as a current collector to form a coating layer of 50-500 µm thick. By allowing the solvent to vaporize one obtains an electrode for a lead-acid battery.

In the aforementioned examples, the starting material for the preparation of NGPs is a graphitic material that may be selected from the group consisting of natural graphite, artificial graphite, graphite oxide, graphite fluoride, graphite fiber, carbon fiber, carbon nano-fiber, carbon nano-tube, mesophase carbon micro-bead (MCMB) or carbonaceous micro-sphere (CMS), soft carbon, hard carbon, and combinations thereof.

Graphite oxide may be prepared by dispersing or immersing a laminar graphite material (e.g., powder of natural flake graphite or synthetic graphite) in an oxidizing agent, typically a mixture of an intercalant (e.g., concentrated sulfuric acid) and an oxidant (e.g., nitric acid, hydrogen peroxide, sodium perchlorate, potassium permanganate) at a desired temperature (typically 0-70° C.) for a sufficient length of time (typically 30 minutes to 5 days). In order to reduce the time required to produce a precursor solution or suspension, one may choose to oxidize the graphite to some extent for a shorter period of time (e.g., 30 minutes) to obtain graphite intercalation compound (GIC). The GIC particles are then exposed to a thermal shock, preferably in a temperature range of 600-1,100° C. for typically 15 to 60 seconds to obtain exfoliated graphite or graphite worms, which are optionally (but preferably) subjected to mechanical shearing (e.g. using a mechanical shearing machine or an ultrasonicator) to break up the graphite flakes that constitute a graphite worm. The un-broken graphite worms or individual graphite flakes are then re-dispersed in water, acid, or organic solvent and ultrasonicated to obtain a graphene polymer solution or suspension.

The pristine graphene material is preferably produced by one of the following three processes: (A) Intercalating the graphitic material with a non-oxidizing agent, followed by a thermal or chemical exfoliation treatment in a non-oxidizing environment; (B) Subjecting the graphitic material to a supercritical fluid environment for inter-graphene layer penetration and exfoliation; or (C) Dispersing the graphitic material in a powder form to an aqueous solution containing a surfactant or dispersing agent to obtain a suspension and subjecting the suspension to direct ultrasonication.

In Procedure (A), a particularly preferred step comprises (i) intercalating the graphitic material with a non-oxidizing agent, selected from an alkali metal (e.g., potassium, sodium, lithium, or cesium), alkaline earth metal, or an alloy, mixture, or eutectic of an alkali or alkaline metal; and (ii) a chemical exfoliation treatment (e.g., by immersing potassium-intercalated graphite in ethanol solution).

In Procedure (B), a preferred step comprises immersing the graphitic material to a supercritical fluid, such as carbon dioxide (e.g., at temperature T>31° C. and pressure P>7.4 MPa) and water (e.g., at T>374° C. and P>22.1 MPa), for a period of time sufficient for inter-graphene layer penetration (tentative intercalation). This step is then followed by a sudden de-pressurization to exfoliate individual graphene layers. Other suitable supercritical fluids include methane, ethane, ethylene, hydrogen peroxide, ozone, water oxidation (water containing a high concentration of dissolved oxygen), or a mixture thereof.

In Procedure (C), a preferred step comprises (a) dispersing particles of a graphitic material in a liquid medium containing therein a surfactant or dispersing agent to obtain a suspension or slurry; and (b) exposing the suspension or slurry to ultrasonic waves (a process commonly referred to as ultrasonication) at an energy level for a sufficient length of time to produce the separated nano-scaled platelets, which are pristine, non-oxidized NGPs.

NGPs can be produced with an oxygen content no greater than 25% by weight, preferably below 20% by weight, further preferably below 5%. Typically, the oxygen content is between 5% and 20% by weight. The oxygen content can be determined using chemical elemental analysis and/or X-ray photoelectron spectroscopy (XPS).

The resulting suspension can be converted into micron-scaled droplets (particulates) using several approaches. For instance, the suspension may be aerosolized or atomized to form fine aerosol particles. Concurrently or subsequently, the liquid or solvent is removed to form solid particles that are typically spherical or ellipsoidal in shape with a diameter or major axis typically less than 10. This procedure may be executed by using an aerosol generation, atomization, spray drying, or inkjet printing apparatus. As an optional but preferred procedure, the solid particles are simultaneously or subsequently subjected to a pyrolysis or carbonization treatment to convert the organic or polymeric material, if existing, into a carbon material. The heat treatment of petroleum or coal-based heavy oil or pitch will serve to convert at least part of the oil or pitch into a meso-phase, an optically anisotropic or liquid crystalline phase of a fused aromatic ring structure. The converted pitch is called a meso-phase pitch. Since NGPs are essentially pure graphite-based or graphene materials, this low temperature heat treatment (350-1,200° C.) has no adverse effect on the NGP structure. Essentially, one can use a spray pyrolysis technique, such as ultrasonic spray pyrolysis or electro-spray pyrolysis, to accomplish both the aerosol generation and pyrolysis procedures For the preparation of an electrode, the binder may be chosen from polytetra-fluoroethylene (PTFE), polyvinylidene fluoride (PVDF), ethylene-propylene-diene copolymer (EPDM), or styrene-butadiene rubber (SBR), for example. Conductive materials such as electronically conductive polymers, meso-phase pitch, coal tar pitch, and petroleum pitch may also be used. Preferable mixing ratio of these ingredients may be 90 to 98% by weight for the particulates, and 2 to 10% by weight for the binder. There is no particularly significant restriction on the type of current collector, provided the material is a good electrical conductor and relatively corrosion resistant. The separator may be selected from a glass fiber mat, synthetic resin nonwoven fabric, porous polyethylene film, porous polypropylene film, or porous PTFE film, etc. A wide range of electrolytes can be used for practicing the instant invention. Most preferred are aqueous and gel electrolytes although other types can be used.

The following examples serve to illustrate the best mode practice of the present invention and should not be construed as limiting the scope of the invention, which is defined in the claims.

Example 1: Graphene Oxide from Sulfuric Acid Intercalation and Exfoliation of MCMBs MCMB (meso-carbon microbeads) were supplied by China Steel Chemical Co. This material has a density of about 2.24 g/cm$^3$ with a median particle size of about 16 μm. MCMBs (10 grams) were intercalated with an acid solution (sulfuric acid, nitric acid, and potassium permanganate at a ratio of 4:1:0.05) for 48 hours. Upon completion of the reaction, the mixture was poured into deionized water and filtered. The intercalated MCMBs were repeatedly washed in a 5% solution of HCl to remove most of the sulphate ions. The sample was then washed repeatedly with deionized water until the pH of the filtrate was neutral. The slurry was dried and stored in a vacuum oven at 60° C. for 24 hours. The dried powder sample was placed in a quartz tube and inserted into a horizontal tube furnace pre-set at a desired temperature, 800° C. for 30 seconds to obtain Sample 1. A small quantity of each sample was mixed with water and ultrasonicated at 60-W power for 10 minutes to obtain a suspension. A small amount was sampled out, dried, and investigated with TEM, which indicated that most of the NGPs were between 1 and 10 layers. Fine particles of lead, lead oxide, or lead sulfate was added to a graphene-water suspension, which was then spray-dried to produce separate samples of particulates containing graphene sheets embracing primary particles and internal graphene sheets.

Example 2: Oxidation and Exfoliation of Natural Graphite

Graphite oxide was prepared by oxidation of graphite flakes with sulfuric acid, sodium nitrate, and potassium permanganate at a ratio of 4:1:0.05 at 30° C. for 48 hours, according to the method of Hummers [U.S. Pat. No. 2,798, 878, Jul. 9, 1957]. Upon completion of the reaction, the mixture was poured into deionized water and filtered. The sample was then washed with 5% HCl solution to remove most of the sulfate ions and residual salt and then repeatedly rinsed with deionized water until the pH of the filtrate was approximately 4. The intent was to remove all sulfuric and nitric acid residue out of graphite interstices. The slurry was dried and stored in a vacuum oven at 60° C. for 24 hours.

The dried, intercalated (oxidized) compound was exfoliated by placing the sample in a quartz tube that was inserted into a horizontal tube furnace pre-set at 1,050° C. to obtain highly exfoliated graphite. The exfoliated graphite was dispersed in water along with a 1% surfactant at 45° C. in a flat-bottomed flask and the resulting graphene oxide (GO) suspension was subjected to ultrasonication for a period of 15 minutes. Fine particles of lead, lead oxide, or lead sulfate was added to a graphene-water suspension, which was then spray-dried to produce separate samples of particulates containing graphene sheets embracing primary particles and internal graphene sheets.

Example 3: Preparation of Pristine
Graphene-Protected Particulates

Pristine graphene sheets were produced by using the direct ultrasonication or liquid-phase production process. In a typical procedure, five grams of graphite flakes, ground to approximately 20 µm or less in sizes, were dispersed in 1,000 mL of deionized water (containing 0.1% by weight of a dispersing agent, Zonyl® FSO from DuPont) to obtain a suspension. An ultrasonic energy level of 85 W (Branson S450 Ultrasonicator) was used for exfoliation, separation, and size reduction of graphene sheets for a period of 15 minutes to 2 hours. The resulting graphene sheets are pristine graphene that have never been oxidized and are oxygen-free and relatively defect-free. There are no other non-carbon elements. Fine particles of lead, lead oxide, or lead sulfate was added to a graphene-water suspension, which was then spray-dried to produce separate samples of particulates containing graphene sheets embracing primary particles and internal graphene sheets.

Example 4: Preparation of Graphene Fluoride
(GF)-Protected Lead and Lead Oxide Particulates Several processes have been used by us to produce GF, but only one process is herein described as an example. In a typical procedure, highly exfoliated graphite (HEG) was prepared from intercalated compound $C_2F \cdot xClF_3$. HEG was further fluorinated by vapors of chlorine trifluoride to yield fluorinated highly exfoliated graphite (FHEG). Pre-cooled Teflon reactor was filled with 20-30 mL of liquid pre-cooled $ClF_3$, the reactor was closed and cooled to liquid nitrogen temperature. Then, no more than 1 g of HEG was put in a container with holes for $ClF_3$ gas to access and situated inside the reactor. In 7-10 days a gray-beige product with approximate formula $C_2F$ was formed. GF sheets were then dispersed in halogenated solvents to form suspensions. Fine particles of lead, lead oxide, or lead sulfate was added to a GF-solvent suspension, which was then spray-dried to produce separate samples of particulates containing graphene sheets embracing primary particles and internal graphene sheets.

Example 5: Preparation of Nitrogenataed
Graphene-Protected Lead and Lead Oxide
Particulates Graphene oxide (GO), synthesized in Example 2, was finely ground with different proportions of urea and the pelletized mixture heated in a microwave reactor (900 W) for 30 s. The product was washed several times with deionized water and vacuum dried. In this method graphene oxide gets simultaneously reduced and doped with nitrogen. The products obtained with graphene/urea mass ratios of 1/0.5, 1/1 and 1/2 are designated as N-1, N-2 and N-3 respectively and the nitrogen contents of these samples were 14.7, 18.2 and 17.5 wt. % respectively as determined by elemental analysis. These nitrogenataed graphene sheets remain dispersible in water. Lead and lead oxide, separately, were then dispersed in the water solution to form two suspension samples for each nitrogen content. The suspensions were separately ultrasonic-sprayed and heated to form particulates.

Example 6: Preparation of Particulates of
Graphene-Protected Lead and Lead Oxide Particles For the preparation of graphene-protected particulates, an amount of a selected electrode active material powder, including fine particles of lead, lead-zinc alloy (1-5% Zn), lead-tin alloy (1-10% Sn), and lead oxide (0.33-5.5 µm in average diameter), was added to a desired amount of GO suspension to form a precursor mixture suspension with a solid content of approximately 10% by weight. After thorough mixing in an ultrasonication reactor, the suspension was then spray-dried to form the particulates of graphene oxide-protected lead or lead oxide particles.

Example 7: Particulates of Graphene-Protected
Lead Particles from Precursor Lead-Containing
Species An appropriate amount of lead monoxide, lead monosulfide, and a 50/50 mixture was slowly added into a suspension prepared in Example 2. The resulting precursor suspension was stirred for 2 hours under an argon flow to ensure a complete, homogeneous dispersion. The suspension was then atomized and spray-dried to obtain spherical particulates of graphene-protected precursor particles. Particulates containing a wide range of graphene amounts were prepared. According to the starting graphene weight and the final total weight, the weight content of graphene (wt %) in the composite particulates was found to be from about 0.5% to 85%. For comparison, simple mixtures of lead particles and graphene sheets and lead particles alone without graphene were also prepared by using a similar procedure.

In one sample, the precursor particulates containing lead monosulfide and some carbon material (e.g. coke) was roasted in the air, allowing the oxidation of lead sulfide with oxygen to occur in the presence of graphene sheets: $2PbS+3O_2 \rightarrow 2PbO+2SO_2\uparrow$. Portion of the particulates containing PbO particles embraced by graphene sheets was then reduced to the lead metal by placing the particulates in a coke-fired blast furnace. The following reaction was allowed to proceed again in the presence of graphene sheets: $2PbO+C \rightarrow Pb+CO_2\uparrow$. Separately, some portion of the particulates containing PbO particles embraced by graphene sheets was heat-treated in air at 250° C. to convert PbO to $PbO_2$ inside graphene-embraced particulates. In another example, the graphene-embraced particulates containing the 50/50 mixture of the lead monoxide and the lead monosulfide and some coal-tar pitch was heated to produce lead metal particles formed on graphene surfaces.

Example 8: Electrochemical Conversion
("Formation") of Lead Sulfate to Lead and Lead
Oxide in the Negative and Positive Electrodes,
Respectively Particulates of graphene-protected lead sulfate particles were prepared according to the procedure described in Examples 1-5. These lead sulfate/graphene particulates are then made into electrode layers bonded onto a current collector using a slurry drying process. Two of the resulting three-layer structures were then assembled, along with a porous separator, as the negative electrode and the positive electrode, respectively, of a lead acid battery. The assembly was housed in a laminated aluminum-nylon pouch (commonly used for a lithium-ion cell), which was then injected with a liquid electrolyte. With the liquid electrolyte in place, this lead acid battery was then subjected to a first charging step (called "formation" or "forming") to effect the electrochemical conversion of lead sulfate species into lead in the negative electrode and lead oxide in the positive electrode according to Eq. 1 and Eq. 2, described earlier.

We have found that the sizes of lead or lead oxide crystals depend upon the type of graphene used; graphene fluoride provides the smallest crystals, followed by nitrogenated graphene, graphene oxide, reduced graphene oxide, and pristine graphene. Smaller crystals lead to higher power densities and higher energy densities, given comparable amounts of active materials in the lead acid batteries.

Example 9: Electrochemical Testing of Lead Acid Battery Cells Containing a Graphene-Protected Particulate Negative Electrode and/or a Graphene-Protected Particulate Positive Electrode For electrochemical testing, both pouch cells (described in Example 8) and coin cells were made. For the coin cells, the working electrodes were prepared by mixing 85 wt % active material (e.g. graphene-protected particulates, layered lead/graphene composites, and lead only, separately), 7 wt % acetylene black (Super-P), and 8 wt % polyvinylidene fluoride (PVDF, 5 wt % solid content) binder dissolved in N-methyl-2-pyrrolidinoe (NMP). After coating the slurries on a sheet of carbon fiber mat, the electrodes were dried at 120° C. in vacuum for 2 h to remove the solvent before pressing. Then, the electrodes were cut into a disk ($\phi$=12 mm) and dried at 100° C. for 24 h in vacuum. Electrochemical measurements were carried out using CR2032 (3V) coin-type cells with lead plate and, separately, presently invented lead electrode, as the counter/reference electrode, Celgard 2400 membrane as separator, and 0.5-10 M $H_2SO_4$ electrolyte solution dissolved in water. The CV measurements were carried out using a CH-6 electrochemical workstation at a scanning rate of 1 mV/s.

The electrochemical performance of three lead acid cells were evaluated: (i) cell featuring graphene-protected particulates (both negative and positive electrodes), (ii) cell containing lead oxide/graphene mixture in the positive and lead/graphene mixture in the negative electrodes, and (iii) cell containing lead oxide alone in the positive electrode and lead alone in the negative electrode each covering a lead alloy grid. The galvanostatic charge/discharge cycling was conducted at a current density of 50 mA/g-10 A/g, using a LAND electrochemical workstation.

Figure 7:
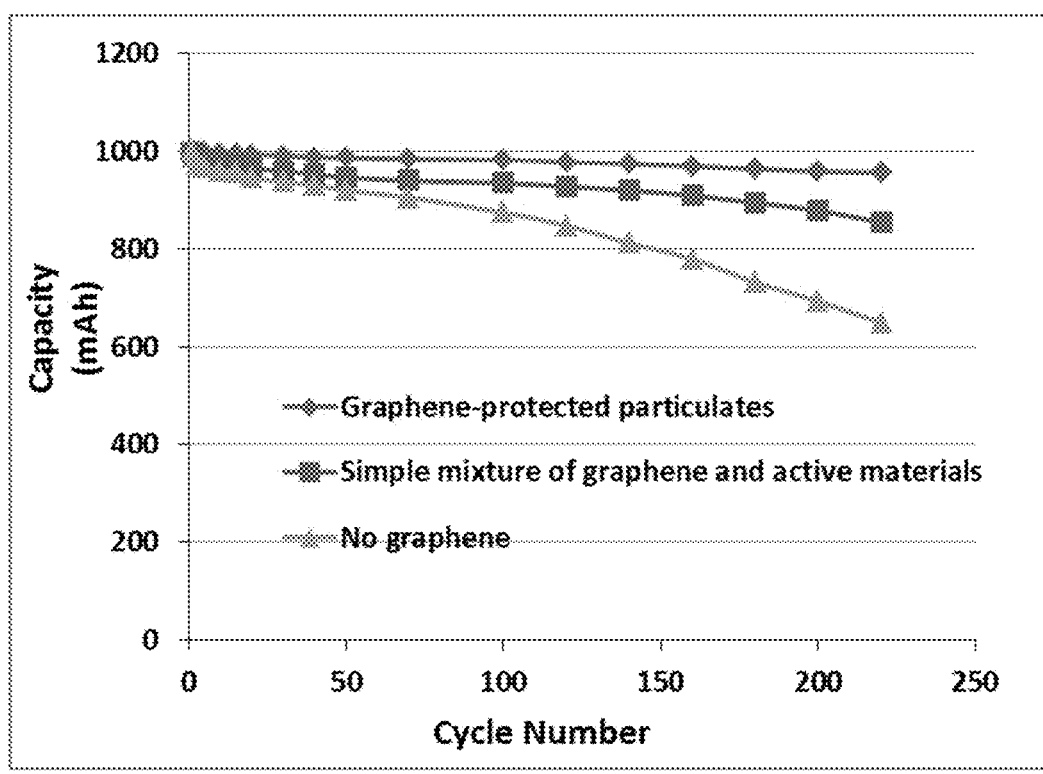
FIG. 7 Charge-discharge cycling behaviors of three lead acid battery cells: (i) cell having both electrodes featuring graphene-protected particulates, (ii) cell having simple active material/graphene mixtures or composites, and (iii) cell having conventional plate-like electrodes.

The results are summarized in FIG. 7, which indicates that the designed capacity of Cell (i) experiences a 4.4% reduction in capacity after 220 charge-discharge cycles at a moderate current density of 200 mA/g. In contrast, Cell (iii) suffers a 35% capacity decay after 220 cycles under comparable testing conditions. The difference is quite dramatic. Cell (ii), containing simple mixtures of graphene and active materials (lead in the negative and lead oxide in the positive electrode), experiences a 14.4% reduction in capacity after 220 cycles. Cell (i) and Cell (ii) have a comparable amount of graphene, each at approximately 7% by weight. Clearly and unexpectedly, the particulate structure is much more effective than the simple mixture structure in protecting the electrode active materials and enhancing the cycle stability of the resulting lead acid cells.

Figure 8:
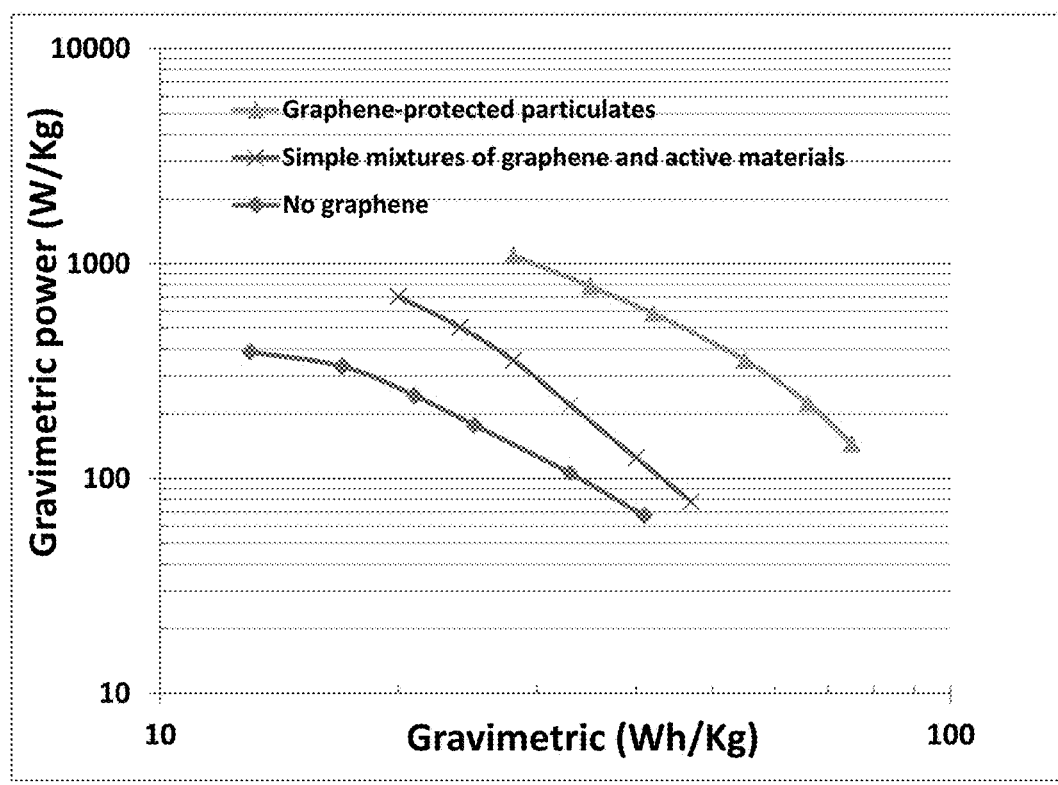
FIG. 8 Ragone plots (specific power vs. specific energy) of three lead acid battery cells: (i) cell having both electrodes featuring graphene-protected particulates, (ii) cell having simple active material/graphene mixtures or composites, and (iii) cell having conventional plate-like electrodes.

FIG. 8 shows the Ragone plots (specific power vs. specific energy) of three lead acid battery cells: (i) having both electrodes featuring graphene-protected particulates, (ii) simple active material/graphene mixtures or composites, and (iii) conventional plate-like electrodes. Again, Cell (i) exhibits the best overall performance, followed by Cell (ii) and then Cell (iii). It is of particular significance to point out that Cell (i) delivers an energy density (specific energy, Wh/kg) and power density (unit of W/kg) as high as 75 Wh/kg and 1,095 W/kg, respectively. These energy density and power density values are unprecedented in the art of lead acid batteries. In contrast, Cell (iii) delivers an energy density of 41 Wh/kg and power density of 387 W/kg. Conventional lead acid batteries typically show an energy density of 20-40 Wh/kg and power density of 100-300 W/kg. Clearly, the presence of graphene sheets in the particulate structure has enabled the active materials in the lead acid battery to more effectively deliver their energy storage capabilities.

Figure 9:
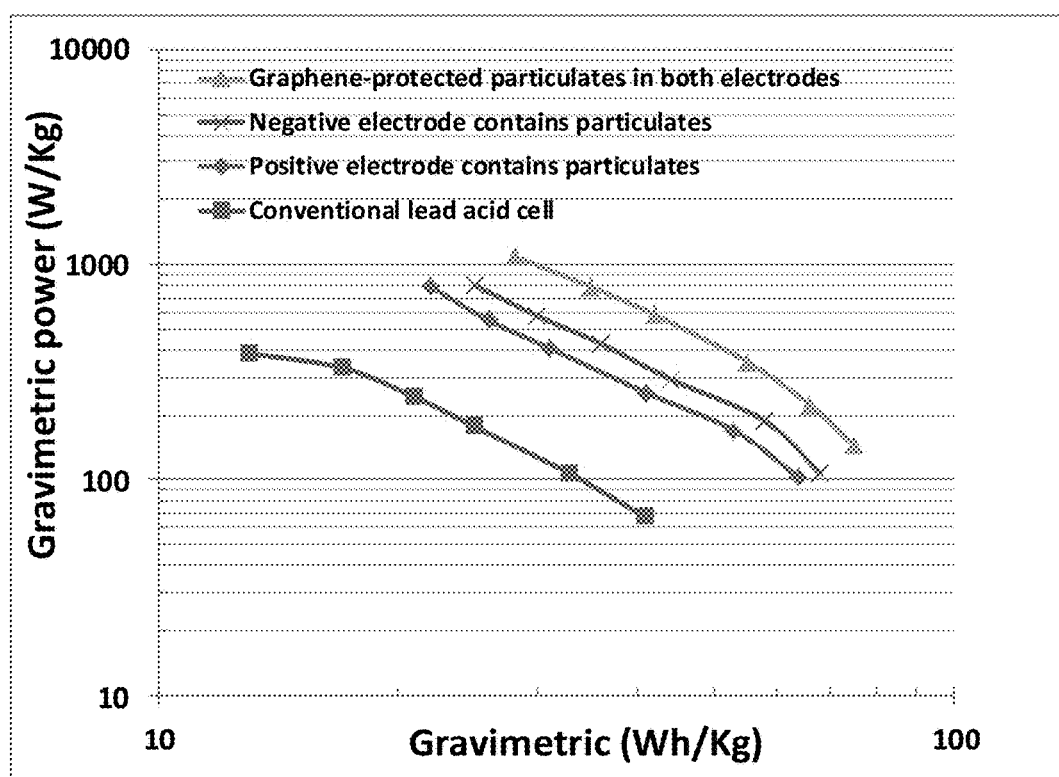
FIG. 9 The Ragone plots of four pouch cells: Cell-A (both the anode and the cathode featuring graphene-enhanced particulates), Cell-B (only the anode featuring graphene-enhanced particulates), Cell-C (only the cathode featuring graphene-enhanced particulates), and Cell-D (conventional lead acid cell).

Shown in FIG. 9 are the Ragone plots of four pouch cells: Cell-A (both the anode and the cathode featuring graphene-enhanced particulates), Cell-B (only the negative electrode featuring graphene-enhanced particulates), Cell-C (only the positive electrode featuring graphene-enhanced particulates), and Cell-D (conventional lead acid cell). These data demonstrates that, when both the negative and positive electrodes of a lead acid battery contains particulates of the graphene-protected active materials, the battery delivers the highest energy density and highest power density. When either (but not both) of the two electrodes features the particulate structure, the energy density and the power density remain superior to those of conventional lead acid batteries, but slightly lower than those of Cell-A where both the positive and negative electrodes contain particulates of graphene-protected active materials.

In conclusion, we have successfully developed a new and novel class of graphene-protected particulate-based negative and positive electrodes for lead acid batteries. Such a graphene-protected particulate platform technology has the following unexpected and highly desirable features and advantages:

(1) Graphene sheets serve as heterogeneous nucleation sites for the lead, lead oxide, and lead sulfate crystals, leading to large numbers of small lead, lead oxide, or lead sulfate crystals or thin coating of lead, lead oxide, or lead sulfate crystals deposited onto surfaces of graphene sheets. These small crystals or thin coatings are capable of fast and complete reactions during repeated charge and discharge cycles. This feature enables a high active material utilization rate, high energy density, high-rate capability, high power density, and long cycle life.

(2) Also quite unexpectedly, there is strong chemical and mechanical affinity between graphene sheets and lead, lead oxide, or lead sulfate crystals. Even upon repeated charge-discharge cycles, these active species remain well-adhered to graphene surfaces. This natural compatibility between graphene and lead species and the intrinsically high strength of graphene sheets imparts good structural integrity to the resulting electrodes.

(3) Graphene sheets in the interior and the exterior surface of a particulate provide not only a robust 3-D network of electron-conducting paths and high conductivity, but also enable the electrode materials to be readily made into electrodes with a high tap density and long-term cycling stability. The most commonly used conductive additives are carbon black (CB) or acetylene black (AB), which do not provide such a capability. Besides, CB and AB are not very conductive. Graphene sheets per se have an electrical conductivity (up to 20,000 S/cm) that is several orders of magnitude higher than that of CB or AB (typically 0.01-10 S/cm).

(4) The use of graphene sheets in a particulate structure also obviates the need to add a flock component (e.g. fibers of polyester, nylon or acrylic fibers) or a "expander" component (e.g. a mixture of barium sulfate, carbon black and lignosulfonate). Graphene sheets alone are capable of improving the performance and cycle lifetime of the battery and increasing the mechanical strength of the electrode.

(5) Quite surprisingly, the procedure of spray-drying, atomization, spray pyrolysis, or ultrasonic spray readily produces graphene-enhanced particulates of a spherical shape that is conducive to the formation of interconnected pores in an actual electrode to enable easy penetration of electrolyte. The embraced primary particles (e.g. lead or lead oxide) having a small diameter (typically smaller than 1 µm and preferably smaller than 100 nm) provide a short diffusion path for proton to enter and leave. This is particularly desirable for power tool and electric vehicle applications where the battery must be capable of being charged and discharged at a high rate.

(6) Further surprisingly, the embracing graphene sheets, being strong and elastic, appear to be capable of effectively cushioning the volume changes of electroactive materials between lead sulfate and lead or lead oxide.

(7) The presently invented graphene-enhanced particulate approach is applicable to both the positive and negative electrodes.

In summary, the presently invented graphene-protected particulates surprisingly impart the following highly desirable attributes to a lead acid battery: high reversible capacity, low irreversibility, high tap density, electrode fabrication ease (spherical or near spherical shape of particulates enables easy electrode fabrication and a high tap density of the electrode), small primary particle sizes (for high-rate capacity), compatibility with commonly used electrolytes, high active material utilization rate, little or no "hard lead sulfate" formation, unprecedentedly high power density and energy density, and long charge-discharge cycle life.

The invention claimed is:

1. A lead acid battery comprising a negative electrode, a positive electrode comprising lead oxide, and an electrolyte in physical contact with said negative electrode and said positive electrode, wherein said negative electrode comprises a plurality of negative particulates of graphene-protected lead or lead alloy and wherein said negative particulates are formed of a single or a plurality of graphene sheets and a single or a plurality of fine lead or lead alloy particles having a size smaller than 10 µm, and the graphene sheets and the lead or lead alloy particles are mutually bonded or agglomerated into each of said negative particulates with at least a graphene sheet encapsulating each of said negative particulates, and wherein said graphene is in an amount of at least 0.01% but less than 99% by weight based on the total weight of each of said negative particulates.

2. The lead acid battery of claim 1, wherein the lead or lead alloy amount is at least 5% by weight.

3. The lead acid battery of claim 1, further comprising a negative current collector or positive current collector consisting essentially of a lead grid, a lead alloy grid, a sheet of mat, paper, or porous film made of metal fibers, metal nano wires, carbon nanofibers, carbon nanotubes, carbon fibers, electro-spun conductive polymer fibers, carbonized electro-spun polymer fibers, metal-coated fibers, carbon-coated fibers, conductive polymer-coated fibers, conductive polymer fibers, or a combination thereof.

4. The lead acid battery of claim 1, wherein each of said negative particulates is substantially spherical or ellipsoidal in shape.

5. The lead acid battery of claim 1, wherein said graphene comprises single-layer graphene or few-layer graphene, wherein said few-layer graphene is defined as a graphene platelet formed of less than 10 graphene planes and said graphene is selected from the group consisting of pristine graphene, graphene oxide, reduced graphene oxide, graphene fluoride, hydrogenated graphene, nitrogenated graphene, doped graphene, chemically functionalized graphene, and combination thereof.

6. The lead acid battery of claim 1, wherein said negative particulates include a core-shell structure wherein said core contains one or multiple particles of lead or lead acid and said shell contain one or multiple sheets of graphene.

7. The lead acid battery of claim 1, wherein said lead or lead alloy particles in each of said negative particulates have a dimension smaller than 1 µm.

8. The lead acid battery of claim 1, wherein said lead or lead alloy particles in each of said negative particulates have a dimension smaller than 100 nm.

9. The lead acid battery of claim 1, further comprising a carbon or graphite material in electronic contact with said lead or lead alloy and a graphene sheet.

10. The lead acid battery of claim 1, further comprising a carbon or graphite material coated on or in contact with at least one of said lead or lead alloy particles, wherein said carbon or graphite material is selected from the group consisting of polymeric carbon, amorphous carbon, chemical vapor deposition carbon, coal tar pitch, petroleum pitch, meso-phase pitch, carbon black, coke, acetylene black, activated carbon, fine expanded graphite particle with a dimension smaller than 100 nm, artificial graphite particle, natural graphite particle, and combinations thereof.

11. The lead acid battery of claim 1, further comprising a separator positioned between said negative electrode and said positive electrode, wherein said separator is selected from a porous film, paper, or mat of a polymer, glass, ceramic material, or a combination thereof.

12. The lead acid battery of claim 1 wherein said lead oxide in said positive electrode is mixed with graphene to form a lead oxide-graphene mixture or composite structure.

13. The lead acid battery of claim 1 wherein said electrolyte contains sulfuric acid in water at an acid concentration of 0.01 M to 10 M.

14. The lead acid battery of claim 1 wherein said negative electrode further comprises a negative current collector and said plurality of negative particulates of graphene-protected lead or lead alloy form one or two negative electrode material layers coated on or bonded to said negative current collector.

15. The lead acid battery of claim 14, wherein said negative current collector comprises a metal grid or a sheet of mat, paper, or porous film made of conductive filaments selected from the group consisting of metal fibers, metal nano wires, carbon nanofibers, carbon nanotubes, carbon fibers, electro-spun conductive polymer fibers, carbonized electro-spun polymer fibers, metal-coated fibers, carbon-coated fibers, conductive polymer-coated fibers, conductive polymer fibers, and combinations thereof.

16. The lead acid battery of claim 1 wherein said positive electrode comprises a plurality of positive particulates of graphene-protected lead oxide, wherein at least one of said positive particulates is formed of a single or a plurality of graphene sheets and a single or a plurality of fine lead oxide particles or coating having a size smaller than 10 µm, and the graphene sheets and the lead oxide particles or coating are mutually bonded or agglomerated into each of said positive particulates with at least a graphene sheet embracing or wrapping around each of said positive particulates, and wherein said graphene is in an amount of at least 0.01% but less than 95% by weight based on the total weight of each of said positive particulates.

17. The lead acid battery of claim 16, wherein said lead oxide particles or coating have a size smaller than 1 µm.

18. The lead acid battery of claim 16, wherein said lead oxide particles or coating have a size smaller than 100 nm.

19. The lead acid battery of claim 16, wherein said positive electrode further comprises a positive current collector and said plurality of positive particulates of graphene-protected lead oxide form one or two positive electrode material layers coated on or bonded to said positive current collector.

20. The lead acid battery of claim 19, wherein said positive current collector comprises a metal grid or a sheet of mat, paper, or porous film made of conductive filaments selected from the group consisting of metal fibers, metal nano wires, carbon nanofibers, carbon nanotubes, carbon fibers, electro-spun conductive polymer fibers, carbonized electro-spun polymer fibers, metal-coated fibers, carbon-coated fibers, conductive polymer-coated fibers, conductive polymer fibers, and combinations thereof.

21. A process for producing the negative particulates of the lead acid battery of claim 1, comprising (a) a step of preparing a suspension of graphene sheets dispersed in a liquid medium and mixing particles of lead or an lead alloy in said suspension to form a multi-component suspension, wherein said graphene is selected from the group consisting of pristine graphene, graphene oxide, reduced graphene oxide, graphene fluoride, hydrogenated graphene, nitrogenated graphene, doped graphene, chemically functionalized graphene, and combinations thereof; and (b) a step of forming said multi-component suspension into a plurality of micro-droplets and removing said liquid medium in such a manner that said lead or lead alloy particles and said graphene sheets are assembled together to form said negative particulates.

22. The process of claim 21, wherein the step (b) includes using a spray-drying, spray-pyrolysis, fluidized-bed drying, atomization or aerosolizing step.

23. A process for producing the negative particulates of the lead acid battery of claim 1, comprising (a) a step of preparing a suspension of graphene sheets dispersed in a liquid medium and mixing particles of a precursor to lead in said suspension to form a multi-component suspension, wherein said graphene is selected from the group consisting of pristine graphene, graphene oxide, reduced graphene oxide, graphene fluoride, hydrogenated graphene, nitrogenated graphene, doped graphene, chemically functionalized graphene, and combinations thereof; (b) a step of forming said multi-component suspension into a plurality of micro-droplets and removing said liquid medium in such a manner that said lead or lead alloy particles and said graphene sheets are assembled together to form precursor particulates; and (c) chemically or thermally converting said precursor particulates to said negative particulates.

24. The process of claim 23, wherein the step (b) includes using a spray-drying, spray-pyrolysis, ultrasonic spraying, fluidized-bed drying, atomization, or aerosolizing step.

25. A lead acid battery comprising a negative electrode comprising lead or an lead alloy, a positive electrode, an electrolyte in physical contact with said negative electrode and said positive electrode, an optional separator positioned between said negative electrode and said positive electrode, wherein said positive electrode comprises a plurality of positive particulates of graphene-protected lead oxide and said positive particulates are formed of a single or a plurality of graphene sheets and a single or a plurality of fine lead oxide particles or coating having a size smaller than 10 µm, and the graphene sheets and the lead oxide particles or coating are mutually bonded or agglomerated into each of said positive particulates with at least a graphene sheet embracing or wrapping around each of said positive particulates, and wherein said graphene is in an amount of at least 0.01% but less than 95% by weight based on the total weight of each of said positive particulates.

26. The lead acid battery of claim 25, wherein the graphene amount is at least 1% by weight but less than 20% by weight.

27. The lead acid battery of claim 25, wherein the graphene amount is at least 5% by weight.

28. The lead acid battery of claim 25, wherein each of said positive particulates is substantially spherical or ellipsoidal in shape.

29. The lead acid battery of claim 25, wherein said graphene comprises single-layer graphene or few-layer graphene, wherein said few-layer graphene is defined as a graphene platelet formed of less than 10 graphene planes and said graphene is selected from the group consisting of pristine graphene, graphene oxide, reduced graphene oxide, graphene fluoride, hydrogenated graphene, nitrogenated graphene, doped graphene, chemically functionalized graphene, and combinations thereof.

30. The lead acid battery of claim 25, wherein said positive particulates include a core-shell structure wherein said core contains one or multiple particles of lead oxide and said shell contain one or multiple sheets of graphene.

31. The lead acid battery of claim 25, wherein said lead oxide particles in each of said positive particulates have a dimension smaller than 1 µm.

32. The lead acid battery of claim 25, wherein said lead oxide particles in each of said positive particulates have a dimension smaller than 100 nm.

33. The lead acid battery of claim 25, wherein said positive electrode further comprises a positive current collector and said plurality of positive particulates of graphene-protected lead oxide form one or two positive electrode material layers coated on or bonded to said positive current collector.

34. The lead acid battery of claim 33, wherein said positive current collector comprises a metal grid or a sheet of mat, paper, or porous film made of conductive filaments selected from the group consisting of metal fibers, metal nano wires, carbon nanofibers, carbon nanotubes, carbon fibers, electro-spun conductive polymer fibers, carbonized electro-spun polymer fibers, metal-coated fibers, carbon-coated fibers, conductive polymer-coated fibers, and combinations thereof.

35. A process for producing the positive particulates of the lead acid battery of claim 25, comprising:

(a) preparing a precursor mixture suspension of a graphene material with a precursor to lead oxide dispersed in a liquid medium, wherein said graphene material is selected from the group consisting of pristine graphene, graphene oxide, reduced graphene oxide, graphene fluoride, hydrogenated graphene, nitrogenated graphene, doped graphene, chemically functionalized graphene and combinations thereof;

(b) dispensing and forming the precursor mixture suspension into precursor particulates; and (c) thermally and/or chemically converting said precursor mixture to said positive particulates of graphene-protected lead.

36. The process of claim 35, wherein said step (b) comprises an atomization, aerosolizing, spray-drying, ultrasonic spraying, spray-pyrolysis, or fluidized-bed drying procedure.

37. An electrode for use in a lead acid battery, said electrode comprising a plurality of particulates of graphene-protected lead, lead alloy, or lead oxide and at least one of said particulates is formed of a single or a plurality of graphene sheets and a single or a plurality of fine lead, lead alloy, or lead oxide particles or coating having a size smaller than 10 µm, and the graphene sheets and the lead, lead alloy, or lead oxide particles or coating are mutually bonded or agglomerated into each of said particulates with the graphene sheet or multiple graphene sheets encapsulating each of said particulates, and wherein said graphene is in an amount of at least 0.01% but less than 95% by weight based on the total weight of each of said particulates.

* * * * *